(12) United States Patent
Agarwal et al.

(10) Patent No.: US 11,853,725 B2
(45) Date of Patent: Dec. 26, 2023

(54) MICROSERVICES RECOMMENDATION FRAMEWORK

(71) Applicant: International Business Machines Corporation, Armonk, NY (US)

(72) Inventors: Shivali Agarwal, Ghaziabad (IN); Raunak Sinha, Greater Noida (IN); Srikanth Govindaraj Tamilselvam, Chennai (IN); Amith Singhee, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 17/542,894

(22) Filed: Dec. 6, 2021

(65) Prior Publication Data

US 2023/0176831 A1 Jun. 8, 2023

(51) Int. Cl.
*G06F 8/34* (2018.01)
*G06F 11/36* (2006.01)
*G06F 16/2457* (2019.01)

(52) U.S. Cl.
CPC .......... *G06F 8/34* (2013.01); *G06F 11/3616* (2013.01); *G06F 16/2457* (2019.01)

(58) Field of Classification Search
CPC ..... G06F 8/34; G06F 11/3616; G06F 16/2457
USPC ................................................. 717/110–178
See application file for complete search history.

(56) References Cited

U.S. PATENT DOCUMENTS

| | | | |
|---|---|---|---|
| 8,978,114 B1* | 3/2015 | Kaushik | G06N 3/08 726/4 |
| 10,474,438 B2 | 11/2019 | Bijani et al. | |
| 10,606,573 B2 | 3/2020 | Apte et al. | |
| 10,936,291 B1* | 3/2021 | Gamliel | G06F 8/72 |
| 10,956,855 B1* | 3/2021 | Coughran | G06Q 10/047 |
| 11,587,143 B2* | 2/2023 | Cetintas | G06F 16/2237 |
| 2014/0074545 A1* | 3/2014 | Minder | G06Q 10/0633 705/7.27 |
| 2017/0255986 A1* | 9/2017 | Herbst | G06Q 30/0609 |

(Continued)

FOREIGN PATENT DOCUMENTS

WO 2021148927 A1 7/2021

OTHER PUBLICATIONS

Hoang, Phuong, et al. "Large-scale occupational skills normalization for online recruitment." AI Magazine 39.1 (2018): pp. 5-14. (Year: 2018).*

(Continued)

*Primary Examiner* — Satish Rampuria
(74) *Attorney, Agent, or Firm* — Daniel Yeates; Ryan, Mason & Lewis, LLP

(57) ABSTRACT

Techniques for recommending microservices to perform the different functions of a legacy architecture are disclosed. In one example, a computer implemented method comprises receiving a plurality of recommendations comprising a plurality of program components as candidates for assignment to a plurality of microservices, and determining roles of respective ones of the plurality of program components. A user interface is provided which is configured to allow a user to modify one or more of the plurality of recommendations based at least in part on the roles. Modifications to the one or more of the plurality of recommendations are analyzed, and one or more metrics are computed based at least in part on the analysis.

20 Claims, 15 Drawing Sheets

(56) References Cited

U.S. PATENT DOCUMENTS

2019/0057338 A1* 2/2019 Botea ............. G06Q 10/063112
2021/0234930 A1* 7/2021 Dinh ...................... G06F 8/425

OTHER PUBLICATIONS

Vázquez-Ingelmo, Andrea, Francisco José García-Peñalvo, and Roberto Therón. "Tailored information dashboards: A systematic mapping of the literature." Proceedings of the XX international conference on human computer interaction. 2019.pp.1-8. (Year: 2019).*

Diewald, Nils, et al. "KorAP Architecture—Diving in the Deep Sea of Corpus Data." Proceedings of the Tenth International Conference on Language Resources and Evaluation (LREC'16). 2016.pp.3586-3591. (Year: 2016).*

Brogi, Antonio, et al. "Bonsai in the fog: An active learning lab with fog computing." 2018 Third International Conference on Fog and Mobile Edge Computing (FMEC). IEEE, 2018.pp. 79-86 (Year: 2018).*

Parlavantzas, Christian Perez, et al. "Project Deliverable." (2016). pp. 1-48 (Year: 2016).*

Tenev, Tihomir, and Simeon Tsvetanov. "Recommendations for enhancing security in microservice environment altered in an intelligent way." 2020 International Conference on Software, Telecommunications and Computer Networks (SoftCOM). IEEE, 2020. pp. 1-6 (Year: 2020).*

L. Theivendra, "IBM Mono2Micro: AI-driven Refactoring of Monoliths to Microservices for WebSphere Liberty," https://community.ibm.com/community/user/wasdevops/blogs/leonard-theivendra1/2021/04/06/mono2micro-intro, May 4, 2021, 6 pages.

B. Ross, "Analyzing and Resolving Dependencies to Free Microservices from a Monolith," https://headspring.com/2018/09/25/analyzing-and-resolving-dependencies-to-free-microservices-from-a-monolith/, Sep. 25, 2018, 6 pages.

H. Harms et al., "Guidelines for Adopting Frontend Architectures and Patterns in Microservices-based Systems," Proceedings of the 2017 11th Joint Meeting on Foundations of Software Engineering, Sep. 2017, pp. 902-907.

M. J. Amiri "Object-aware Identification of Microservices," 2018 IEEE International Conference on Services Computing, 2018, pp. 253-256.

Z. Ren et al., "Migrating Web Applications from Monolithic Structure to Microservices Architecture," Proceedings of the Tenth Asia-Pacific Symposium on Internetware, Sep. 2018, 10 pages.

W. Jin et al., "Functionality-oriented Microservice Extraction Based on Execution Trace Clustering," 2018 IEEE International Conference on Web Services, 2018, pp. 211-218.

L. Nunes et al., "From a Monolith to a Microservices Architecture: An Approach Based on Transactional Contexts," European Conference on Software Architecture, Springer, 2019, 16 pages.

L. Baresi et al., "Microservices Identification through Interface Analysis," European Conference on Service-Oriented and Cloud Computing, Springer, Sep. 2017, 15 pages.

P. Mell et al., "The NIST Definition of Cloud Computing," Recommendations of the National Institute of Standards and Technology, Special Publication 800-145, Sep. 2011, 7 pages.

Google Search, "Servlet," https://www.google.com/search?q=servlet&sxsrf=AOaemvLCsh2sfGNbn95ErqGiodPmvButQA%3A1636644675009&ei=QjeNYe_4PPKqggfKtrXYBA&%E2%80%A6, Accessed Nov. 11, 2021, 3 pages.

Wikipedia, "Quartile," https://en.wikipedia.org/w/index.php?title=Quartile&oldid=1041261639, Aug. 29, 2021, 6 pages.

Google Search, "java class," https://www.google.com/search?q=java+class&oq=java +c&aqs=chrome.1.69i57j69i59j0i67i43312j0i20i263i433i512j0i67i433j0i433i51212j0i20i263i512j0%E2%80%A6, Accessed Nov. 11, 2021, 4 pages.

Science Direct, "Degreen Centrality—An Overview," Science Direct Topics, https://www.sciencedirect.com/topics/computer-science/degree-centrality, Accessed Nov. 11, 2021, 16 pages.

Wikipedia, "Call Graph," https://en.wikipedia.org/w/index.php?title=Call_graph&oldid=1047649156, Oct. 1, 2021, 5 pages.

Google Search, "databean in java," https://www.google.com/search?q=databean+in +java&oq=databean&aqs=chrome.2.69i57j46i175i199i512j0i512j0i10i512j0i512j0i10i30j0i30j0i10i30j01%E2%80%A6, Accessed Nov. 11, 2021, 2 pages.

T. Akinwumi, "How to Use a What-if Analysis to Measure the Effects of Your Decisions," https://www.shopify.com/enterprise/what-if-analysis-business-impact, Apr. 24, 2020, 3 pages.

* cited by examiner

200

201 — Determine the [In-Degree/Out-Degree] Ratio of All Classes Based on the Count of Incoming and Outgoing Edges. All Classes with a Ratio Higher than Average Ratio are Considered as Utility-Candidates 202 — Calculate Quartiles from the In-Frequency of All Utility Candidates 203 — From the Utility Candidates, Shortlist those Candidates with Out-Degree <= 2

204 — From the Remaining Utility Candidates, Further Shortlist those Candidates with an In-Frequency >= Third-Quartile 205 — Expand Utility Candidates

Original Seeds
Seed list 1:
com.ibm.websphere.samples.daytrader.beans.RunStatsDataBean
Seed list 2:
com.ibm.websphere.samples.daytrader.entities.OrderDataBean
Seed list 3:
com.ibm.websphere.samples.daytrader.beans.MarketSummaryDataBean
Seed list 4:
com.ibm.websphere.samples.daytrader.entities.AccountProfileDataBean
Seed list 5:
com.ibm.websphere.samples.daytrader.entities.AccountDataBean
Seed list 6:
com.ibm.websphere.samples.daytrader.entities.HoldingDataBean

Edited Seeds
Seed list 1:
com.ibm.websphere.samples.daytrader.beans.RunStatsDataBean,com.ibm.websphere.samples.daytrader.util.CompleteOrderThread,com.ibm.websphere.samples.daytrader.entities.OrderDataBean,com.ibm.websphere.samples.daytrader.web.jsf.QuoteJSF
Seed list 2:
com.ibm.websphere.samples.daytrader.entities.AccountDataBean
Seed list 3:
com.ibm.websphere.samples.daytrader.beans.MarketSummaryDataBean
Seed list 4:
com.ibm.websphere.samples.daytrader.entities.AccountProfileDataBean
Seed list 5:
com.ibm.websphere.samples.daytrader.entities.HoldingDataBean
Seed list 6:
com.ibm.websphere.samples.daytrader.web.prims.PingServlet2PDF,com.ibm.websphere.samples.daytrader.web.prims.PingBean,com.ibm.websphere.samples.daytrader.web.prims.PingUpgradeServlet$1,com.ibm.websphere.samples.daytrader.web.prims.PingUpgradeServlet,com.ibm.websphere.samples.daytrader.ejb3.TradeSLSBRemote,com.ibm.websphere.samples.daytrader.ejb3.TradeSLSBLocal,com.ibm.websphere.samples.daytrader.web.prims.ejb3.PingServlet2Session2Entity,com.ibm.websphere.samples.daytrader.web.prims.ejb3.PingServlet2Session2Entity2JSP,com.ibm.websphere.samples.daytrader.web.jsf.HoldingData

```
⊟ [ ] refactor_candidates_group
    ├─ ■ 0 : "com.ibm.websphere.samples.daytrader.web.prims.PingServletCDIBeanManagerViaCDICurren"
    ├─ ■ 1 : "com.ibm.websphere.samples.daytrader.web.prims.PingServlet31Async$ReadListenerimpl"
    ├─ ■ 2 : "com.ibm.websphere.samples.daytrader.web.prims.ExplicitGC"
    ├─ ■ 3 : "com.ibm.websphere.samples.daytrader.web.prims.PingServletWriter"
    ├─ ■ 4 : "com.ibm.websphere.samples.daytrader.util.KeyBlock$KeyBlockIterator"
    └─ ■ 5 : "com.ibm.websphere.samples.daytrader.web.prims.PingEJBLocal"
⊟ { } seeds
    ⊟ [ ] 15934288898581959553318912
    │   ├─ ■ 0 : "com.ibm.websphere.samples.daytrader.beans.RunStatsDataBean"
    │   ├─ ■ 1 : "com.ibm.websphere.samples.daytrader.util.CompleteOrderThread"
    │   ├─ ■ 2 : "com.ibm.websphere.samples.daytrader.entities.OrderDataBean"
    │   └─ ■ 3 : "com.ibm.websphere.samples.daytrader.web.jsf.QuoteJSF"
    ⊟ [ ] 15934288898582324625539072
    │   └─ ■ 0 : "com.ibm.websphere.samples.daytrader.entities.AccountDataBean"
    ⊟ [ ] 15934288898582827136712704
    │   └─ ■ 0 : "com.ibm.websphere.samples.daytrader.beans.MarketSummaryDataBean"
    ⊟ [ ] 15934288898583467086839808
    │   └─ ■ 0 : "com.ibm.websphere.samples.daytrader.entities.AccountProfileDataBean"
    ⊟ [ ] 15934288898583821421641728
        └─ ■ 0 : "com.ibm.websphere.samples.daytrader.entities.HoldingDataBean"
⊟ [ ] new_cluster
    ├─ ■ 0 : "com.ibm.websphere.samples.daytrader.web.prims.PingServlet2PDF"
    ├─ ■ 1 : "com.ibm.websphere.samples.daytrader.web.prims.PingBean"
    ├─ ■ 2 : "com.ibm.websphere.samples.daytrader.web.prims.PingUpgradeServlet$1"
    ├─ ■ 3 : "com.ibm.websphere.samples.daytrader.web.prims.PingUpgradeServlet"
    ├─ ■ 4 : "com.ibm.websphere.samples.daytrader.ejb3.TradeSLSBRemote"
    ├─ ■ 5 : "com.ibm.websphere.samples.daytrader.ejb3.TradeSLSBLocal"
    ├─ ■ 6 : "com.ibm.websphere.samples.daytrader.web.prims.ejb3.PingServlet2Session2Entity"
    ├─ ■ 7 : "com.ibm.websphere.samples.daytrader.web.prims.ejb3.PingServlet2Session2Entity2JSP"
    └─ ■ 8 : "com.ibm.websphere.samples.daytrader.web.jsf.HoldingData"
```

FIG. 7

MICROSERVICES RECOMMENDATION FRAMEWORK

BACKGROUND

Many legacy systems comprise a monolithic architecture, where functionally distinguishable features are interconnected. In contrast, microservices comprise collections of loosely coupled, fine-grained and parallelized services implementing lightweight protocols. Techniques are needed to convert legacy monolithic architectures into systems that use separate functionally distinct components such as, microservices, to perform the different functions. Difficulties may arise in connection with the classification of the functional aspects of a given architecture and their assignment to different microservices.

SUMMARY

Embodiments of the invention provide techniques for recommending microservices to perform the different functions of a legacy architecture.

In one illustrative embodiment, a computer implemented method comprises receiving a plurality of recommendations comprising a plurality of program components as candidates for assignment to a plurality of microservices, and determining roles of respective ones of the plurality of program components. A user interface is provided which is configured to allow a user to modify one or more of the plurality of recommendations based at least in part on the roles. Modifications to the one or more of the plurality of recommendations are analyzed, and one or more metrics are computed based at least in part on the analysis.

Further illustrative embodiments are provided in the form of a computer program product comprising a non-transitory computer readable storage medium having embodied therein executable program code that when executed by a processor causes the processor to perform the above computer implemented method. Still further illustrative embodiments comprise an apparatus or system with a processor and a memory configured to perform the above computer implemented method.

These and other features and advantages of embodiments described herein will become more apparent from the accompanying drawings and the following detailed description.

BRIEF DESCRIPTION OF THE DRAWINGS

FIG. 2A depicts a utility detection process flow according to an illustrative embodiment.

FIG. 6A depicts a plurality of original seeds presented to a user in connection with a plurality of microservices candidates according to an illustrative embodiment.

FIG. 6B depicts a depicts a plurality of edited seeds edited by a user in connection with the plurality of microservices candidates according to an illustrative embodiment.

FIG. 7 depicts a sampling of tracked edits of microservice candidates according to an illustrative embodiment.

DETAILED DESCRIPTION

Figure 1:
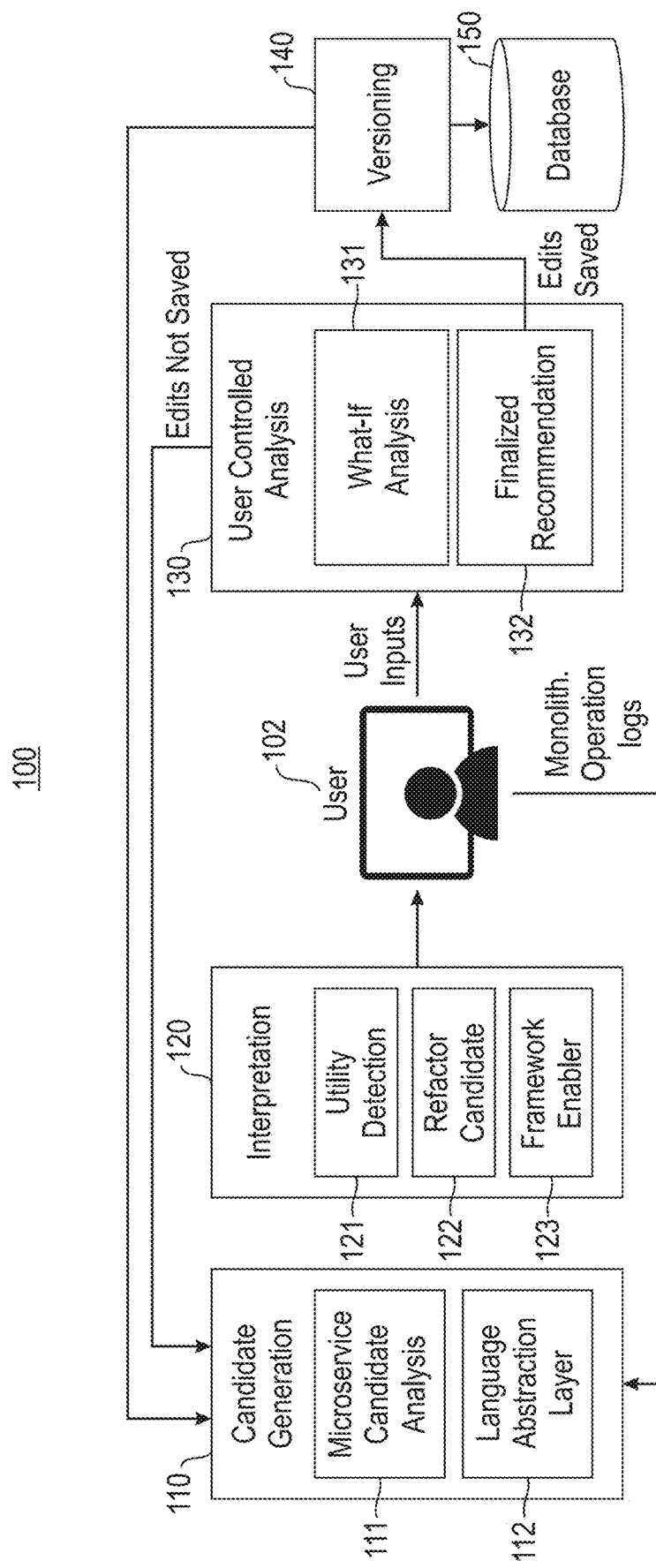
FIG. 1 illustrates a system for the analysis and recommendation of microservices in connection with performing different functions of a legacy architecture according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass a wide variety of processing systems, by way of example only, processing systems comprising cloud computing and storage systems as well as other types of processing systems comprising various combinations of physical and/or virtual processing resources.

As mentioned above in the background section, when converting legacy monolithic architectures into systems that use microservices, difficulties may arise in connection with the classification of the functional aspects of a given architecture and their assignment to different microservices. For example, recommended partitions of a legacy architecture may correspond to microservices, requiring subject matter expert (SME) intervention to assist with partition classification and the determination of with which microservices partitions should be associated. In more detail, according to one or more embodiments, a partition corresponds to a microservice and multiple classes form a partition/microservice. An SME intervenes to assist in correcting some mapping of a class to a partition or may want to redo a partition by merging or splitting partitions, or adding a new partition. Each partition can correspond to an enterprise functionality that a set of classes in the partition carry out as a service. Moreover, code refactoring may be required to result in executable microservices.

The embodiments advantageously provide a microservice recommendation and analysis framework to assist users with understanding microservice candidate recommendations by providing, for example, insights about which classes applications should be assigned to (e.g., business, utilities, framework, etc.). As an additional advantage, the embodiments provide users with the ability to edit microservice candidate recommendations and execute testing to determine whether their modifications are effective.

In more detail, the embodiments advantageously process microservice candidate recommendations along with application analysis artifacts such as, for example, call graph information and operation logs, and analyze dependencies between program entities (e.g., procedures and classes) and partitions to generate actionable interpretations. More specifically, the embodiments provide techniques for determining which program components correspond to functionality type processes, custom utilities, shared utilities and framework enablers, as well as which program files may need to be refactored in order to produce de-duplicated code for microservices.

As an additional advantage, the embodiments interpret the portions of the legacy code irrespective of the programming language. In other words, the embodiments are language agnostic, supporting procedural languages (e.g., COBOL), object-oriented programming (OOP) languages (e.g., Java, C#) and interpreted languages (e.g., Python).

The embodiments further provide techniques for users to control, through edits on a user interface, the candidate recommendations, and to test edited recommendations using what-if analysis, and to provide finalized recommendations for versioning or to be used as constraints in further analysis. Users may add and/or delete microservice candidates as needed.

FIG. 1 depicts a system 100 for the analysis and recommendation of microservices in connection with performing different functions of a legacy architecture according to an illustrative embodiment. As shown in FIG. 1 by lines and/or arrows, the components of the system 100 are operatively connected to each other via, for example, physical connections, such as wired and/or direct electrical contact connections, and/or wireless connections, such as, for example, WiFi, BLUETOOTH, IEEE 802.11, and/or other networks, including but not limited to, a local area network (LAN), wide area network (WAN), cellular network, ad hoc networks (e.g., wireless ad hoc network (WANET)), satellite network or the Internet. For example, a network can operatively link a candidate generation engine 110 to an interpretation engine 120 and the components thereof.

The system 100 comprises the candidate generation engine 110, which includes a microservice candidate analysis layer 111 and language abstraction layer 112. The interpretation engine 120 includes a utility detection layer 121, a refactor candidate layer 122 and a framework enabler layer 123. The system 100 further includes a user controlled analysis engine 130, a versioning engine 140 and a database 150. The user controlled analysis engine 130 includes a what-if analysis layer 131 and a finalized recommendation layer 132.

The microservice candidate analysis layer 111 uses one or more machine learning techniques such as, for example, one or more community detection algorithms to generate a plurality of recommendations comprising a plurality of program components as candidates for assignment to a plurality of microservices. For example, a legacy architecture may comprise a monolithic architecture with interconnected functionally distinguishable features. The microservice candidate analysis layer 111 partitions monolith codebases into different groups based on, for example, different microservices that may be configured to handle the different functions of the monolith architecture. The recommendations may comprise, for example, a plurality of program components corresponding to different microservices, the plurality of program components comprising, for example, clusters, classes (e.g., Java® classes), program units (e.g., COBOL program units), .Net class equivalents, procedures or other types of program partitions.

Using the language abstraction layer 112, in order to provide a language agnostic solution, the embodiments are configured to analyze programs regardless of their language. For example, the system is configured to support procedural languages (e.g., COBOL), object-oriented programming (OOP) languages (e.g., Java®, C#) and interpreted languages (e.g., Python®). In one or more embodiments, the language abstraction layer 112 abstracts out the implementation structure of a program in a common JavaScript Object Notation (JSON) format, which is used to display items on a user interface and to process inputs from a user 102.

Static analysis tools and technologies can be specific to a programming language. Through the language abstraction layer 112, the embodiments represent the outcomes of static analysis such as, for example, call graphs and entry points, in a generic JSON representation which is then provided to, for example, the interpretation engine 120 for further analysis. The analysis is represented in terms of, for example, classes, procedures, methods, database tables, user interface elements (e.g., HTML) or other equivalent representations. Operational logs can be analyzed independent of language constructs using, for example, a data-processing pipeline configured to transform data from a variety of sources (e.g., Logstash).

The interpretation engine 120 takes as input microservice candidate recommendations from the candidate generation engine 110 along with application analysis artifacts such as, but not necessarily limited to, call graph information and operation logs, and analyzes dependencies between program components and further groups the program components into different roles to generate actionable interpretations for the program entities of a legacy architecture. More specifically, the utility detection layer 121, a refactor candidate layer 122 and a framework enabler layer 123 of the interpretation engine 120 determine which entities correspond to functionality processes, custom utilities, shared utilities and framework enabler files. For the entities which correspond to functionality classes, the refactor candidate layer 122 identifies which program files need to be refactored in order to produce de-duplicated code for microservices. The interpretation engine 120 identifies dependencies between program components, and determines which program components may be functionally overloaded and in need of refactoring.

The utility detection layer 121 recognizes utilities in different forms such as, for example, custom utilities (e.g., commonly invoked math computation code), shared utilities (e.g., logs), framework or infrastructure support files (e.g., Spring® framework files). The utility detection layer 121 recognizes the differences between utility nodes and standard nodes. For example, the utility detection layer 121 may identify utility nodes as implementing common functionality that is reused. Such nodes are likely to be called more often or connected to a higher number of classes than standard nodes. In identifying utility nodes, the utility detection layer 121 enables the creation of microservices based on utility patterns derived from structural properties of the legacy code.

Figure 2B:
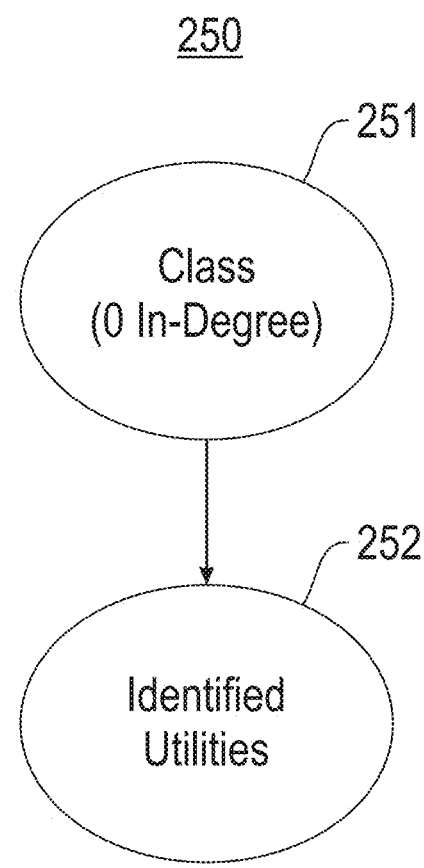
FIG. 2B depicts a utility chain according to an illustrative embodiment.

Referring to FIG. 2A, in a utility detection process flow 200, referring to block 201, an in-degree/out-degree ratio of all classes (or other type of program component) is determined based on a count of incoming and outgoing edges to and from a given class. All classes (or other type of program component) with a ratio higher than an average ratio are identified as utility candidates. "In-degree" refers to a number of connections (e.g., edges) that point inward to a vertex (or node) representing a program component, and "out-degree" refers to a number of connections (e.g., edges) that point outward from a vertex (e.g., node) representing the program component to other vertices (e.g., nodes) representing other program components.

Referring to block 202, quartiles are calculated from the in-frequency of all utility candidates. According to the embodiments, a "quartile" refers to a type of quantile dividing a number of data points into four equal-sized or approximately equal-sized parts (e.g., quarters). Referring to block 203, from the utility candidates, those candidates with an out-degree ≤2 are shortlisted. Referring to block 204, from the remaining utility candidates, the candidates with an in-frequency ≥ third quartile are further shortlisted. Then, referring to block 205, the utility candidates are expanded based on utility chains. For example, referring to the utility chain 250 in FIG. 2B, program components (e.g., classes) that have an in-degree value of 0 (element 251) and have outgoing edges to the identified utilities (element 252) are added as utilities. Utilities having these features may be, for example, custom utility functions, such as, for example, Ping.

In some cases, program components are not able to be assigned to a unique microservice, as they may be interacting with multiple program components across more than one microservice. In such a case, these program components may need to be present in multiple microservices and the refactor candidate layer 122 identifies the program components as code refactoring candidates. Upon refactoring, the relevant functionality from the program component is assigned to the correct microservice.

Figure 3:
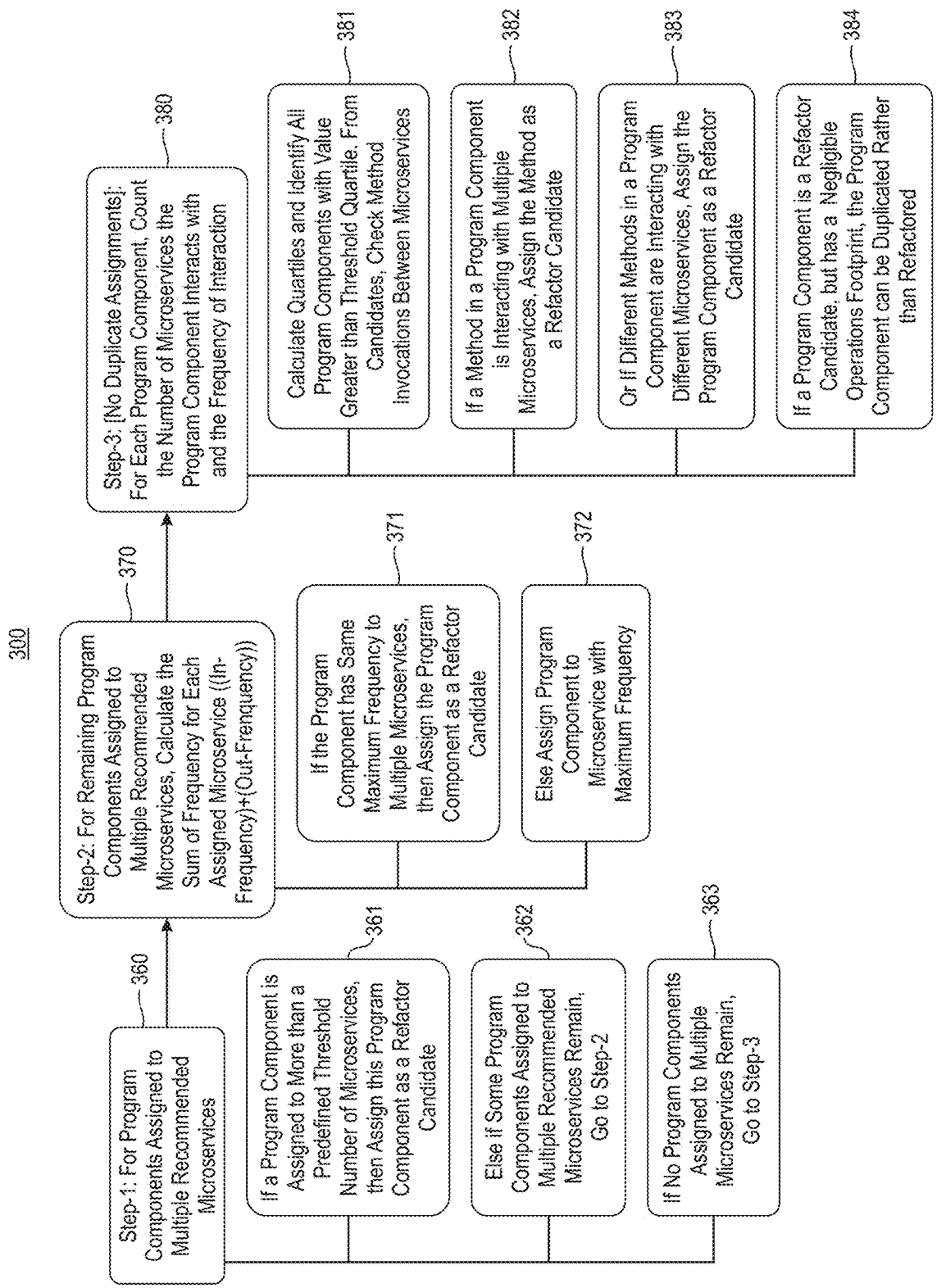
FIG. 3 depicts a process flow for detecting refactoring candidates according to an illustrative embodiment.

The refactor candidate layer 122 determines which program components should be considered for refactoring in case they are duplicated across microservices. Refactor candidates are determined using structural and operational properties when, for example, operational logs or equivalent information is available. Referring to FIG. 3, a process flow 300 for detecting refactor candidates is shown. Referring to blocks 360 and 361, for program components assigned to multiple recommended microservices, if a program component (e.g., class) is assigned to more than a predefined threshold number of microservices, then this program component is assigned as a refactor candidate. At block 362, for any remaining program components assigned to more than one microservice but less than the predefined threshold number of microservices, proceed to step 2 (block 370). At block 363, if there are no remaining program components assigned to more than one microservice, then proceed to step 3 (block 380).

Referring to block 370, for remaining program components assigned to more than one microservice and less than the predefined threshold number of microservices from block 361, the sum of frequency for each microservice to which the program component is assigned ((in-frequency)+(out-frequency)) is calculated. Referring to block 371, if the program component has the same maximum frequency to multiple microservices, then the refactor candidate layer 122 assigns the program component as a refactor candidate. Referring to block 372, if the program component does not have the same maximum frequency to multiple microservices, then the refactor candidate layer 122 assigns the program component to the microservice with the maximum frequency.

Referring to block 380, if there are no remaining program components assigned to more than one microservice, for each program component, the refactor candidate layer 122 counts the number of microservices the program component interacts with and computes the frequency of interaction with each microservice to determine that the program component would not be deemed a utility (see block 201 in FIG. 2A and corresponding explanation). Next, at block 381, the refactor candidate layer 122 calculates quartiles and identifies all program components with a value greater than a threshold quartile. From the identified program components, the refactor candidate layer 122 checks method invocations between microservices. Referring to block 382, if a method in a program component is interacting with multiple microservices, the refactor candidate layer 122 assigns the method as refactor candidate. Referring to block 383, if different methods in a program component are interacting with different microservice, the refactor candidate layer 122 assigns the program component as a refactor candidate. At block 384, if a program component is a refactor candidate, but has a negligible operations footprint, the refactor candidate layer 122 determines that the program component can be duplicated (e.g., assigned to multiple microservices) rather than refactored.

Referring back to FIG. 1, once recommendations are provided for microservice candidates of a legacy architecture by the candidate generation engine 110 and the role of program components (e.g., utility role, a functionality role and a framework enablement role) is interpreted by the interpretation engine 120, a user 102 may want to observe the effects of moving certain program components from one microservice to another, adding and/or deleting microservices and/or program components and/or modifying one or more roles and/or refactor candidates. Such testing prior to finalization of microservice candidates can be managed by a user 102 via a user interface appearing on a computing/processing device of the user ("user device"), and controlled by the what-if analysis layer 131 of the user controlled analysis engine 130. As used herein, a "what-if analysis" refers to an analytical process that determines the effect of changing one or more variables from baseline or original settings. According to one or more embodiments, a what-if analysis produces metrics such as, for example, coverage, cohesion or other quality metrics, values indicating enterprise alignment of the microservice candidates and enterprise relevance scores for each microservice candidate. In one or more embodiments, the enterprise relevance score is determined from operational logs computed using call volume to particular program entities associated with a given microservices candidate over a particular time period (e.g., week, month, year, etc.). As can be seen the edits associated with the what-if analysis are fed back to the candidate generation engine 110 and, in turn, to the interpretation engine 120 to produce changes in microservice candidates, roles and refactor candidates for consideration by a user 102 following the what-if analysis.

User 102 can fine tune or perform modifications for multiple iterations of the what-if analysis. Once a user 102 (e.g., computer architect) is satisfied with the results of the analysis that takes into account their edits, the user 102 can switch to a finalized recommendation mode via the user interface, and save their edits in a database 150. The finalized recommendation mode is controlled by the finalized recommendation layer 132. The finalized microservice candidate recommendations are saved and sent to a versioning engine 140, which is used to develop the application programming interface (API) end points for executable microservices. User 102, via the user interface, can opt to not save their changes, where the changes do not impact other recommendations, or opt to save their changes and allow the candidate generation and interpretation engines 110 and 120 to re-analyze a monolith architecture treating their suggestions as constraints.

According to an embodiment, the what-if analysis is stateless, such that the edits are not saved, and each run considers the edits made by a user from the original state. In contrast, the finalized recommendations are saved by the finalized recommendation layer 132 and carried forward for future analysis.

Figure 4:
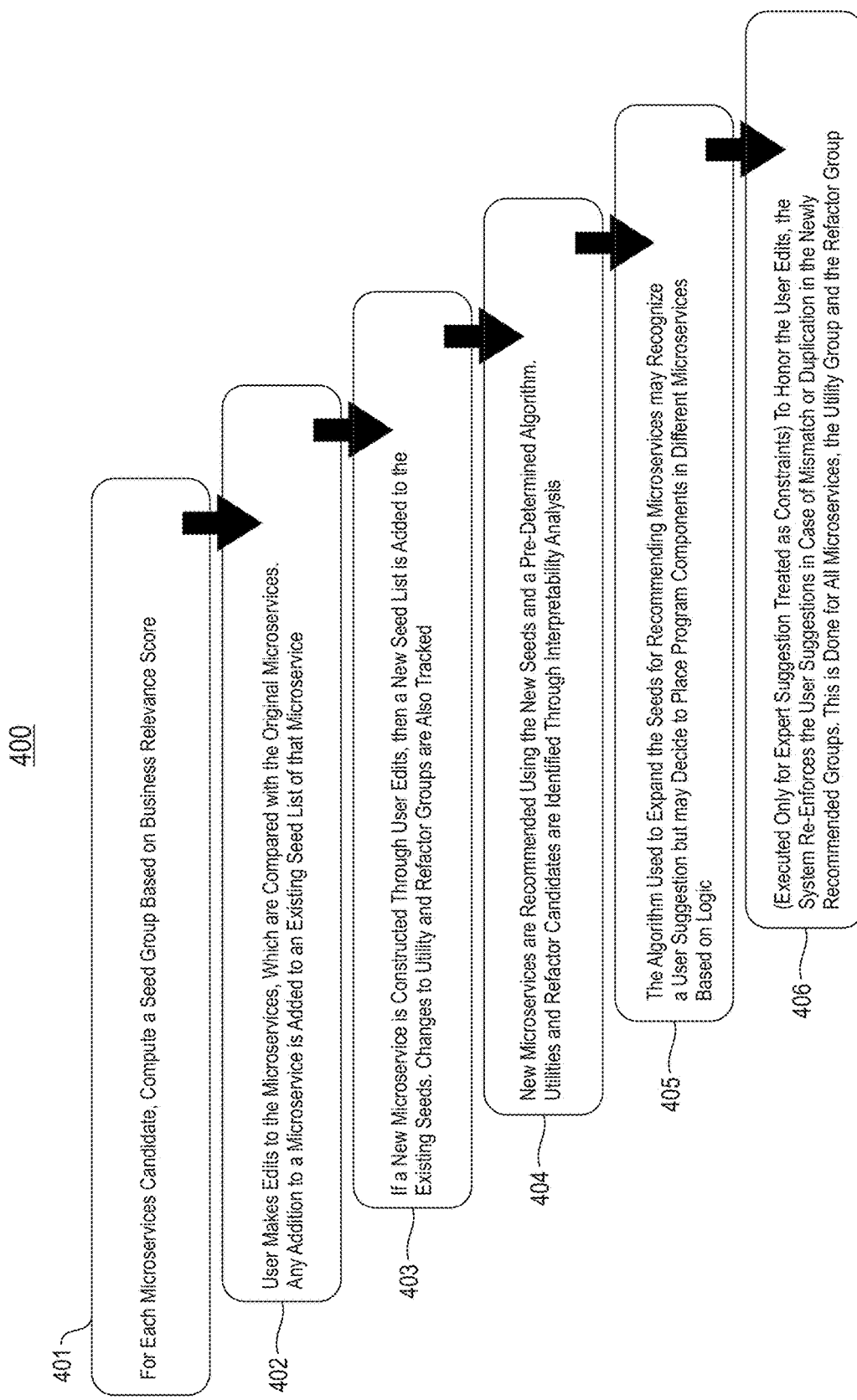
FIG. 4 depicts a process flow for accommodating user intervention according to an illustrative embodiment.

Referring to FIG. 4, in a process flow 400 for accommodating user intervention, at block 401, for each microservices candidate, the interpretation engine 120 computes a seed group based on enterprise relevance score. The seed group 601 in FIG. 6A depicts a plurality of original seeds presented to a user in connection with a plurality of microservices candidates. At block 402, a user 102 via a user interface, makes edits to the microservices, which are compared with the original microservices. Any addition to a microservice is added to an existing seed list of that microservice. As used herein, a "seed" is to be broadly construed to refer to a program component (e.g., class) and is chosen based on the program component that closely captures the enterprise functionality that a microservice partition represents.

Referring to block 403, if a new microservice is constructed through user edits, then a new seed list is added to the existing seeds. Changes to utility and refactor groups are also tracked. An edited seed group 602 in FIG. 6B depicts a plurality of edited seeds edited by a user in connection with the plurality of microservices candidates from FIG. 6A. At block 404, following a what-if analysis, new microservices are recommended using the new seeds and a pre-determined algorithm (e.g., community detection algorithm or other machine learning algorithm). Utilities and refactor candidates are identified through interpretability analysis performed by the interpretation engine 120.

Referring to block 405, the machine learning algorithm used to expand the seeds for recommending microservices may recognize a user suggestion, but may decide to place program components (e.g., classes) in different microservices based on logic learned from algorithm training. Referring to block 406, when expert suggestion treated as constraints as described herein above, to honor the user edits, the system 100 re-enforces user suggestions in case of mismatch or duplication in the newly recommended groups. This is done for all microservices, the utility group and the refactor group. FIG. 7 depicts a layout 700 of example tracked edits of microservices candidates that may appear on a user interface. The layout 700 illustrates modifications to different groups (e.g., refactor candidates group and different seed groups), and a new cluster so that user edits can be tracked.

Figure 5A:
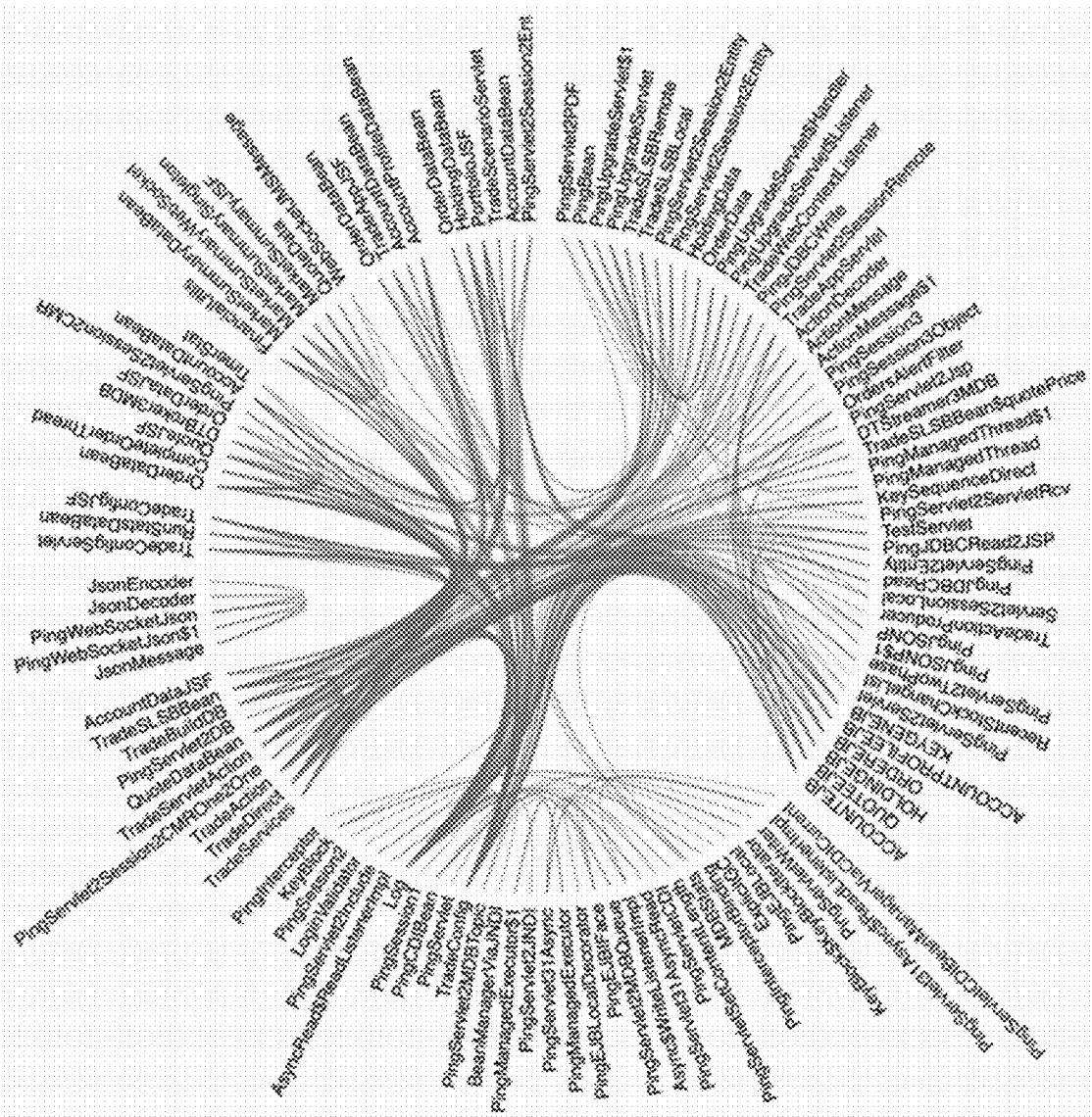
FIG. 5A depicts a diagram of a plurality of microservice candidates presented to a user according to an illustrative embodiment.
Figure 5B:
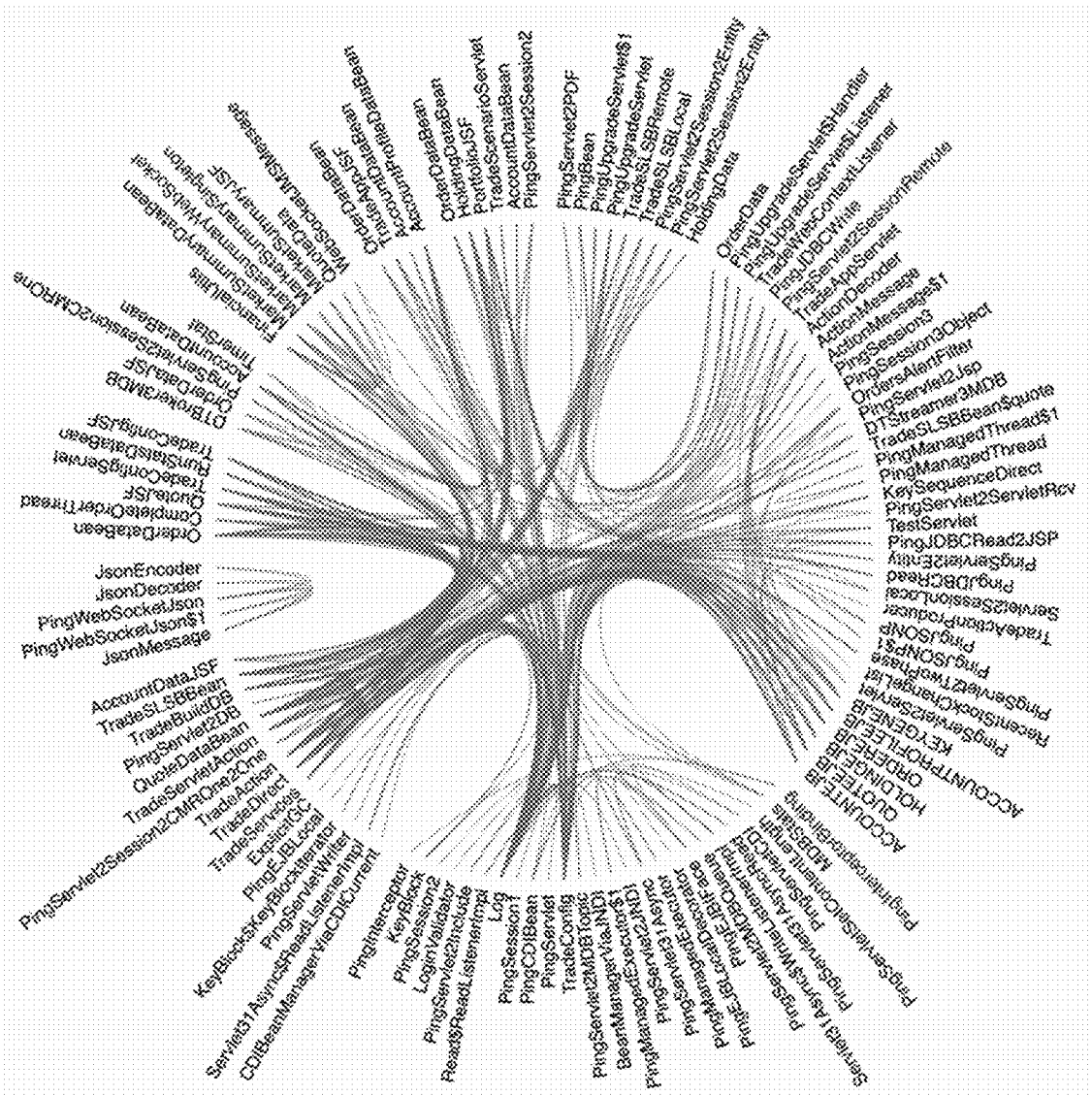
FIG. 5B depicts a depicts a diagram of the plurality of microservice candidates edited by user according to an illustrative embodiment.

FIG. 5A depicts a diagram 501 of a plurality of program components presented to a user 102 as microservice candidates by the candidate generation engine 110. The microservices candidates may be further categorized by the interpretation engine 120 as, for example, utilities (e.g., shared and custom utilities such as, for example, logs and timers), refactor candidates having multiple functionalities or being overloaded with functionalities corresponding to multiple microservices, or framework enablers. FIG. 5B depicts a depicts a diagram 502 of the plurality of program components following editing by a user 102 as described herein to, for example, move certain program components from one microservice to another, add and/or delete microservices and/or program components and/or modify one or more roles and/or refactor candidates.

Given an example scenario where the number of microservices proposed by a user 102 is equal to the number of recommended microservices from the candidate generation engine 110 following a what-if analysis, the user controlled analysis engine 130 generates a mapping between the seed list of the user edits and the newly formed recommended microservices by checking for maximum overlap ("max-overlap") between the seed-list and recommended microservices (Step 1). If two different seed lists have max-overlap with the same microservice, a frequency count between seed list classes and microservice classes is computed and the maximum is chosen for creating pairs (Step 2). If multiple seed-classes again are mapped to the same microservice or a seed list is mapped to multiple microservices (which is possible as a seed list may have maximum frequency to two groups, then the user controlled analysis engine 130 derives an inference from this dependency flow that the seed list has a similar affinity to multiple clusters. As a result, an ID-based assignment between seeds and microservices is performed (e.g., seed-list-1 is mapped to microservice-1) (Step 3). Based on the created mapping, the user recommended seed-list-to-microservice assignment is enforced (Step 4).

Given an example scenario where the number of recommended microservices from the candidate generation engine 110 following a what-if analysis is less the number of microservices proposed by a user 102, the above-described Steps 1 and 2 are performed with the condition that each microservice will have at least one seed list, and each seed list is mapped to at most one microservice group (condition-A). It is to be understood that the number of recommended microservices can be less than the number of proposed microservices since the machine learning algorithm used by the candidate generation engine 110 can merge near-duplicate microservices.

If condition-A is not satisfied, during seed expansion, the ID of the merged microservice is tracked. For example, assume seed lists—sA, sB, and sC create microservice groups—mA, mB, and mC. If mA is merged with mB during seed expansion, then sB and sC would be mapped to mB and mC, respectively, but sA cannot be mapped to any cluster. In such a case the algorithm assignment is given precedence over user assignment for nodes in sA. Based on the created mapping, the user recommended seed-list-to-microservice assignment is enforced.

The interpretation engine 120 may assign a user-defined utility program component to a utility group, refactor group or as part of a microservice group. In order to honor the user recommendation, in the event the program component is determined by the interpretation engine 120 as a refactor candidate, the frequency to other refactor program components and utility program components is calculated. If the total frequency to the utility group is higher than to other groups, the program component is assigned to the utility group. In the event the interpretation engine 120 assigns the program component to a microservice group and has a majority (e.g., greater than half) of incoming edges from program components in the utility group, then the program component is assigned to the utility group.

The interpretation engine 120 may assign a user-defined refactor program component to a utility group or refactor group. In the event the interpretation engine 120 assigns the program component to a utility group, the frequency to other refactor program components and utility program components is calculated. If total frequency to the refactor group is higher than that to the utility group, then the program component is assigned to the refactor group.

Figure 8:
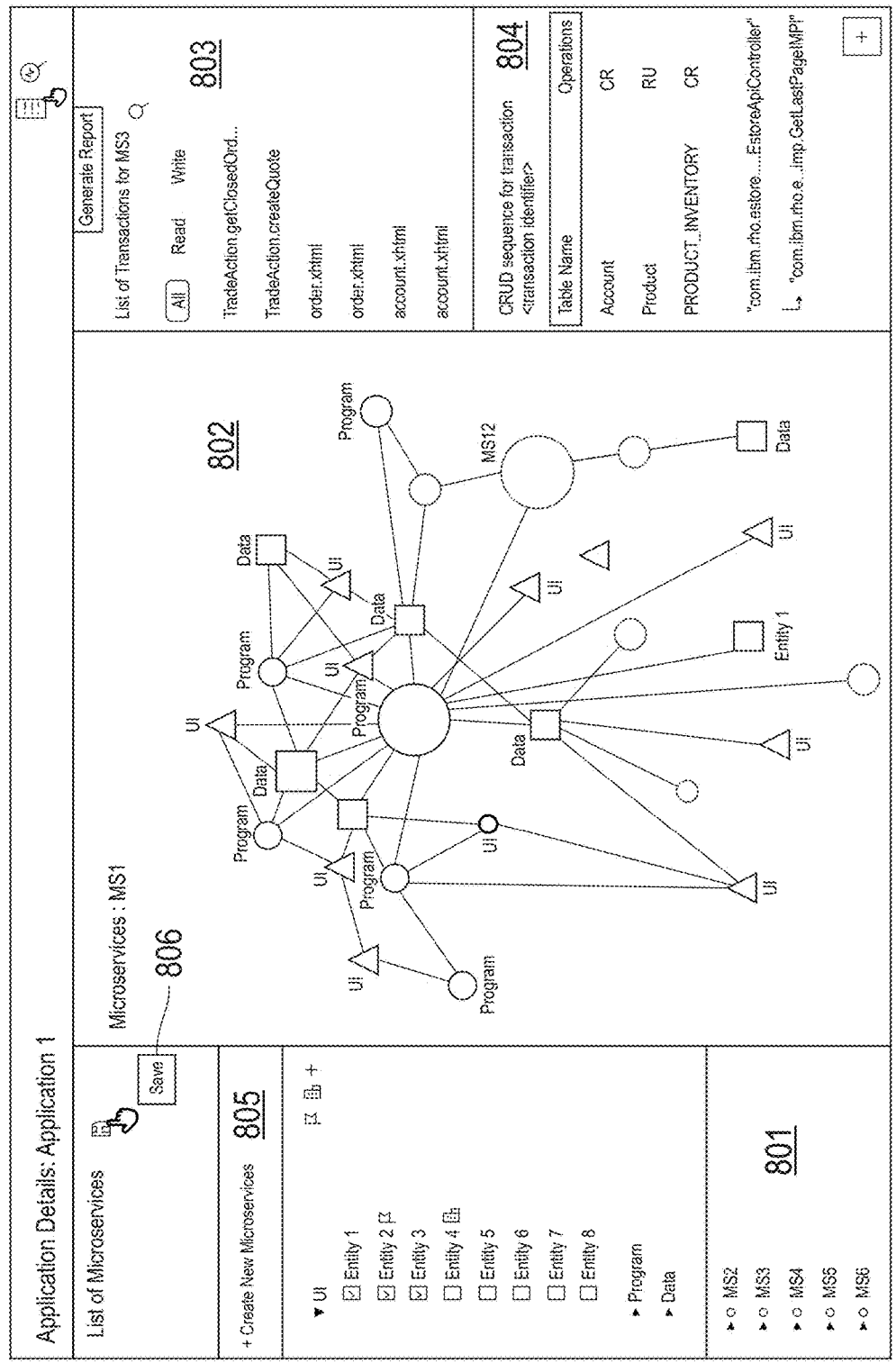
FIG. 8 depicts a user interface used in connection with the analysis and editing of microservice candidates according to an illustrative embodiment.

FIG. 8 depicts a user interface 800 used in connection with the analysis and editing of microservice candidates for a given application (e.g., Application 1). Referring to the user interface 800 in FIG. 8, the user interface 800 permits users to select entities (e.g., Entity 1, Entity 2, Entity 3, Entity 4, Entity 5, Entity 6, Entity 7, Entity 8) on which what-if analysis can be performed. The user interface 800 provides a user 102 with access to a plurality of microservices 801 (e.g., MS1, MS2, MS3, MS4, MS5 and MS6), with a visualization 802 of different microservices and their components, transaction lists 803 for selected microservices, including create, read, update and delete (CRUD) sequences 804 for selected transactions. The user interface 800 further provides a user 102 with the ability to create a new microservice (element 805) and to save changes (element 806).

Figure 9:
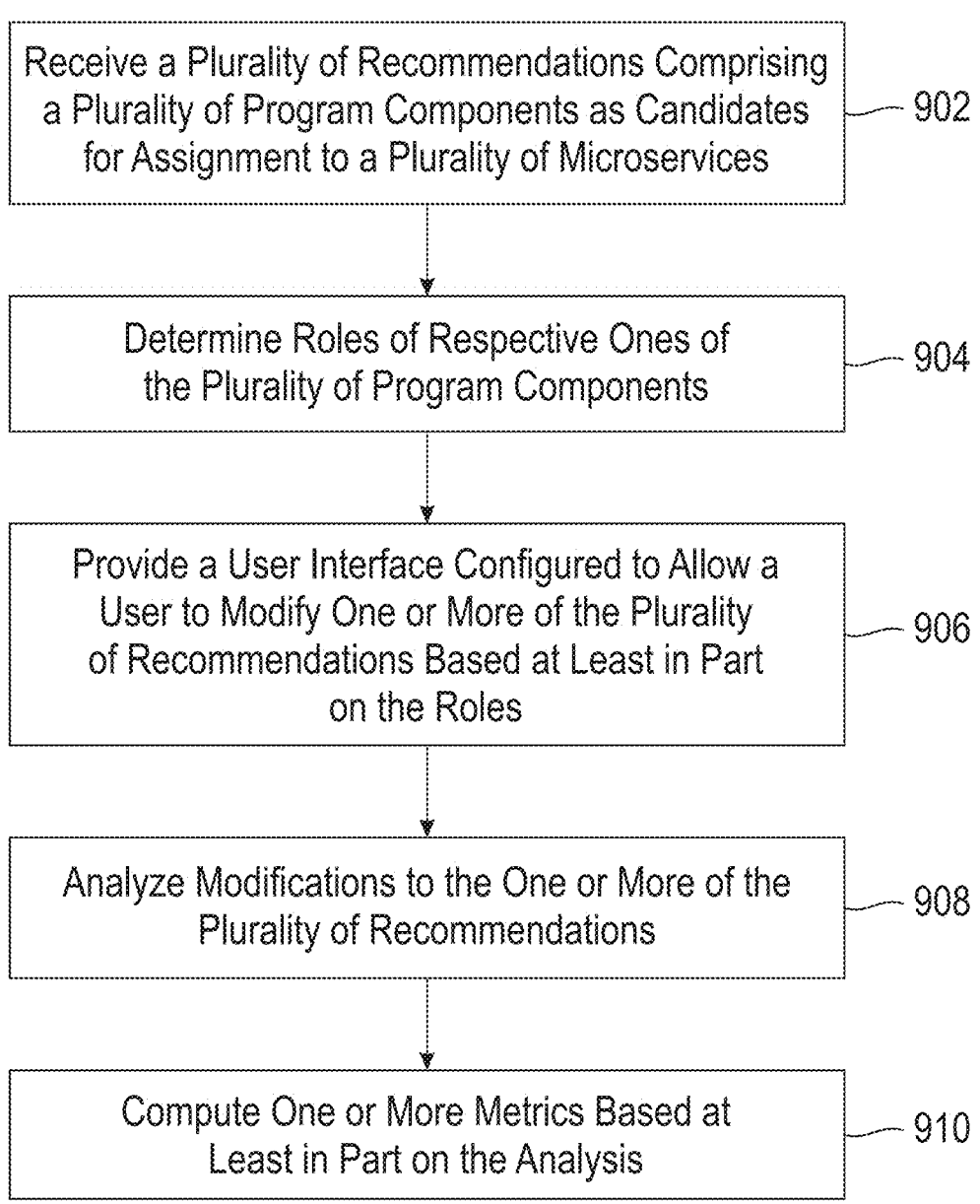
FIG. 9 illustrates a microservices analysis and recommendation process flow according to an illustrative embodiment.

Taking into account the above and other features described herein, FIG. 9 illustrates a microservices analysis and recommendation methodology 900. In step 902, a plurality of recommendations comprising a plurality of program components as candidates for assignment to a plurality of microservices are received. As noted herein, the program components comprise, for example, clusters, classes (e.g., Java® classes), program units (e.g., COBOL program units), .Net class equivalents, procedures or other types of program partitions.

In step 904, roles of respective ones of the plurality of program components are determined. The roles comprise one or more of a utility role, a functionality role and a framework enablement role. The roles may be determined for a plurality of programming languages.

In one or more embodiments, as explained in connection with FIG. 2A herein, determining the roles of the respective ones of the plurality of program components comprises determining an in-degree:out-degree ratio of the respective ones of the plurality of program components, and classifying under the utility role a subset of the respective one of the plurality of program components having an in-degree:out-degree ratio higher than an average in-degree:out-degree ratio of the respective ones of the plurality of program components. Quartiles are calculated based at least in part on in-degree values of the respective ones of the plurality of program components in the subset.

In step 906, a user interface configured to allow a user to modify one or more of the plurality of recommendations based at least in part on the roles is provided. In step 908, modifications to the one or more of the plurality of recommendations are analyzed. In step 910, one or more metrics are computed based at least in part on the analysis. The user interface displays at least one of the plurality of recommendations, the roles and the one or more metrics in format (e.g., JSON format) that is generic with respect to the plurality of programming languages.

In one or more embodiments, the methodology further includes determining which of the respective ones of the plurality of program components require refactoring. As described herein in connection with FIG. 3, the determining of which of the respective ones of the plurality of program components require refactoring comprises determining a subset of the respective ones of the plurality of program components corresponding to greater than a threshold number of the plurality of microservices, and identifying the subset of the respective ones of the plurality of program components as requiring refactoring.

Analyzing the modifications to the one or more of the plurality of recommendations comprises performing a what-if analysis. The modifications comprise, for example, a re-assignment of one or more of the plurality of program components from a first microservice of the plurality of microservices to a second microservice of the plurality of microservices, an addition of a new program component to the plurality of program components, and/or a deletion of a program component from the plurality of program components.

The one or more metrics comprise an enterprise relevance score of the respective ones of the plurality of program components, wherein the enterprise relevance score is computed based at least in part on call volume to the respective ones of the plurality of program components over a given time period.

The techniques depicted in FIGS. 1-9 can also, as described herein, include providing a system, wherein the system includes distinct software modules, each of the distinct software modules being embodied on a tangible computer readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer readable recordable storage medium with code adapted to be executed to carry out at least one method step described herein, including the provision of the system with the distinct software modules.

Additionally, the techniques depicted in FIGS. 1-9 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 10:
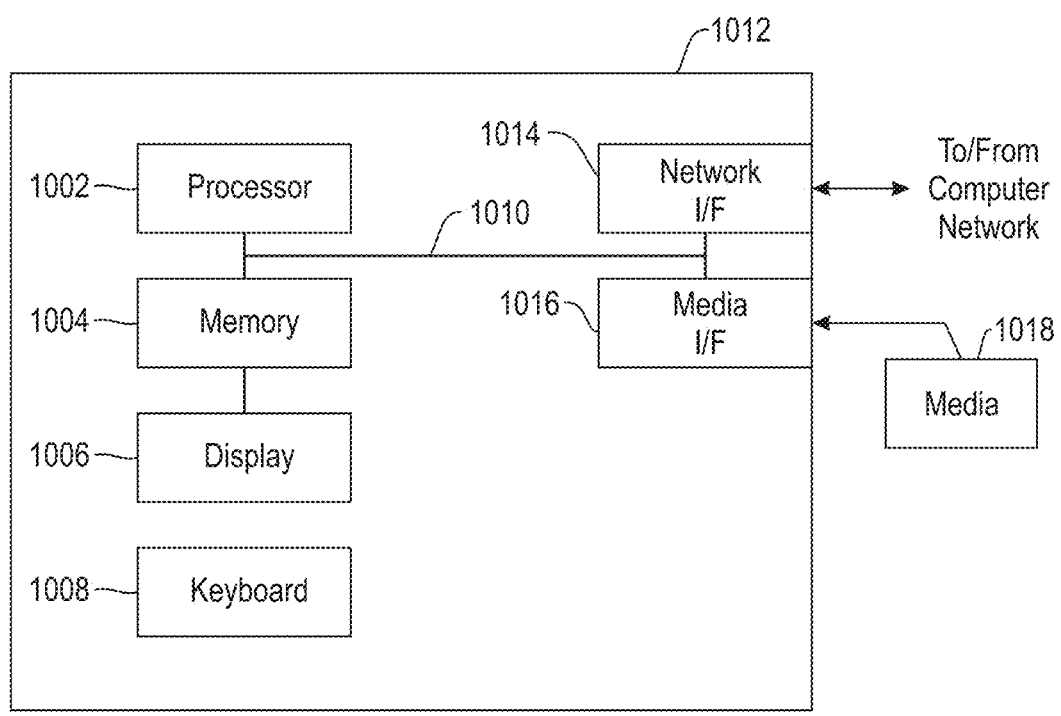
FIG. 10 illustrates an exemplary information processing system according to an illustrative embodiment.

Additionally, an embodiment of the present invention can make use of software running on a computer or workstation. With reference to FIG. 10, such an implementation might employ, for example, a processor 1002, a memory 1004, and an input/output interface formed, for example, by a display 1006 and a keyboard 1008. The term "processor" as used herein is intended to include any processing device, such as, for example, one that includes a multi-core CPU, GPU, FPGA and/or other forms of processing circuitry such as one or more ASICs. Further, the term "processor" may refer to more than one individual processor. The term "memory" is intended to include memory associated with a processor (e.g., CPU, GPU, FPGA, ASIC, etc.) such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 1002, memory 1004, and input/output interface such as display 1006 and keyboard 1008 can be interconnected, for example, via bus 1010 as part of a data processing unit 1012. Suitable interconnections, for example via bus 1010, can also be provided to a network interface 1014, such as a network card, which can be provided to interface with a computer network, and to a media interface 1016, such as a diskette or CD-ROM drive, which can be provided to interface with media 1018.

Accordingly, computer software including instructions or code for performing the methodologies of embodiments of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1002 coupled directly or indirectly to memory elements 1004 through a system bus 1010. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 1008, displays 1006, pointing devices, and the like) can be coupled to the system either directly (such as via bus 1010) or through intervening I/O controllers (omitted for clarity).

Network adapters such as network interface 1014 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 1012 as shown in FIG. 10) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 1002. Further, a computer program product can include a computer readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICs), functional circuitry, an appropriately programmed digital computer with associated memory, and the like. Given the teachings of the invention provided herein, one of ordinary skill in the related art will be able to contemplate other implementations of the components of the invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
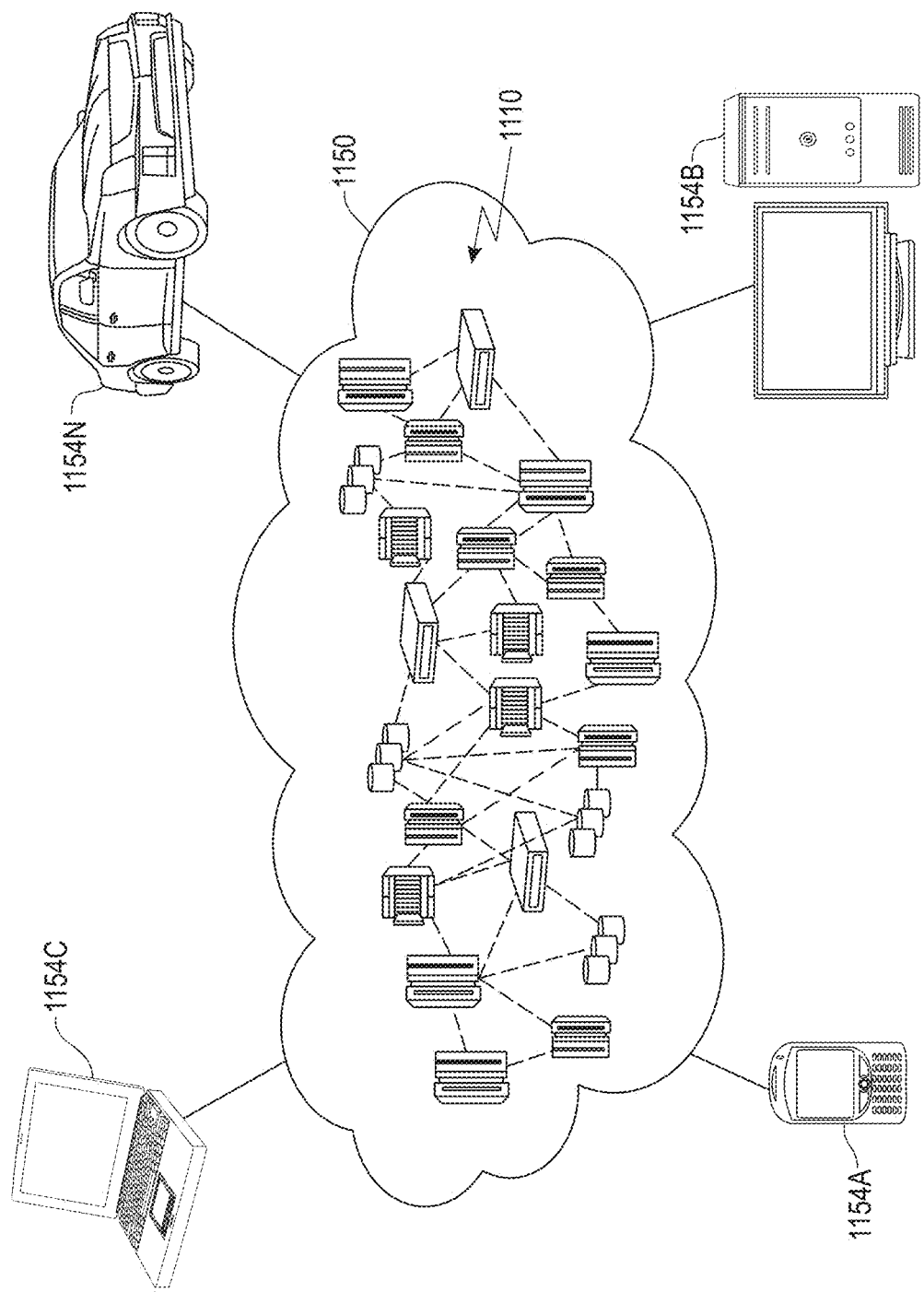
FIG. 11 illustrates a cloud computing environment according to an illustrative embodiment.

Referring now to FIG. 11, illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
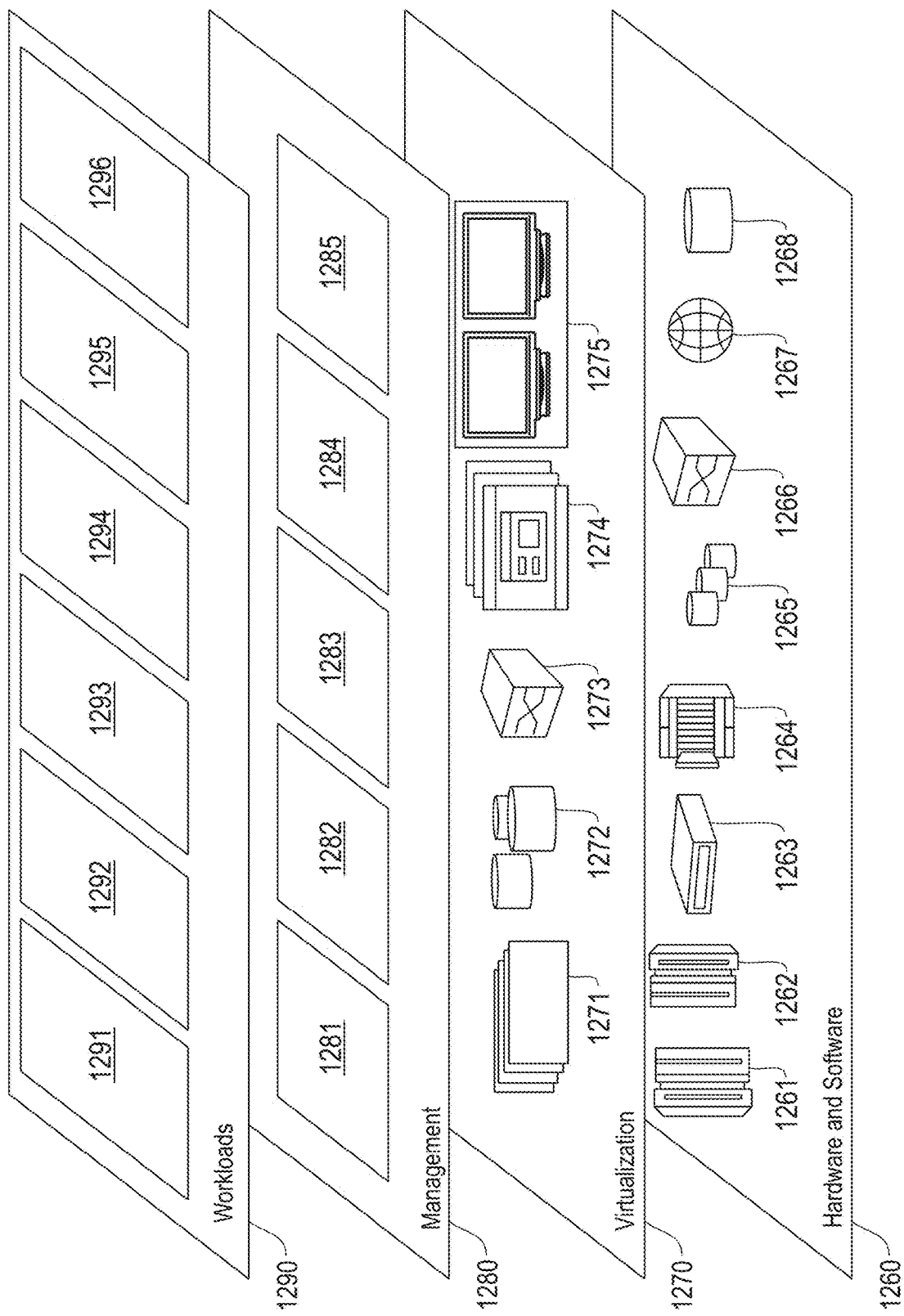
FIG. 12 illustrates abstraction model layers according to an illustrative embodiment.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture-based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275. In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Examples of workloads and functions which may be provided from this layer include: mapping and navigation 1291; software development and lifecycle management 1292; virtual classroom education delivery 1293; data analytics processing 1294; transaction processing 1295; and microservices analysis and recommendation 1296, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, a framework (e.g., a set of one or more framework configurations) for recommending and assigning microservices to perform the different functions of a legacy architecture. Unlike current approaches, the embodiments advantageously provide users with flexibility and control to manage performance of what-if analysis in connection with assigning microservices to perform legacy architecture functions. The embodiments permit users to control, through a user interface, microservice candidate recommendations and to perform what-if analysis in connection with modifications to microservice candidate recommendations. In addition, the embodiments advantageously treat user edits as final versions to rely on when developing executable microservices or as constraints in connection with further analysis.

Once a system provides microservice candidate recommendations, the embodiments permit users to fine tune or perform corrections to the recommendations. For example, a user may add or delete a candidate, with such modifications being treated as soft or hard constraints to be used in further analysis or in the development of microservices.

As noted herein, the embodiments advantageously interpret program components as shared utilities, custom utilities, framework enablers or functionally overloaded refactor candidates. Current approaches do not provide flexibility and control to enable fine-tuning to eliminate duplicative recommendations and provide full coverage of a legacy architecture. As an additional advantage, the embodiments enable re-tooling of microservice candidate recommendations in a language agnostic system that interprets legacy architectures regardless of the programming languages.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a computer readable storage medium having program instructions embodied therewith, the program instructions executable by one or more processors to cause the one or more processors to:
generate a plurality of recommendations comprising a plurality of program components as candidates for assignment to a plurality of microservices, wherein respective ones of the plurality of program components are in respective ones of a plurality of programming languages, and wherein, in generating the plurality of recommendations, the program instructions cause the one or more processors to transform respective implementation structures of the respective ones of the plurality of program components from the respective ones of the plurality of programming languages to a common format;
determine roles of the respective ones of the plurality of program components;
provide a user interface configured to allow a user to modify one or more of the plurality of recommendations based at least in part on the roles;
analyze modifications to the one or more of the plurality of recommendations;
compute one or more metrics based at least in part on the analysis, wherein the one or more metrics comprise an enterprise relevance score of the respective ones of the plurality of program components, and wherein the enterprise relevance score is computed based at least in part on call volume to the respective ones of the plurality of program components over a given time period;
determine a plurality of finalized recommendations for one or more of the respective ones of the plurality of program components for assignment to one or more of the plurality of microservices based at least in part on the one or more metrics; and
generate one or more application programming interfaces for executing the one or more of the plurality of microservices.

2. The computer program product of claim 1, wherein the program instructions further cause the one or more processors to determine which of the respective ones of the plurality of program components require refactoring.

3. The computer program product of claim 2, wherein, in determining which of the respective ones of the plurality of program components require refactoring, the program instructions cause the one or more processors to:
determine a subset of the respective ones of the plurality of program components corresponding to greater than a threshold number of the plurality of microservices; and
identifying the subset of the respective ones of the plurality of program components as requiring refactoring.

4. The computer program product of claim 1, wherein the roles comprise one or more of a utility role, a functionality role and a framework enablement role.

5. The computer program product of claim 4, wherein, in determining the roles of the respective ones of the plurality of program components, the program instructions cause the one or more processors to:
determine an in-degree:out-degree ratio of the respective ones of the plurality of program components; and
classify under the utility role a subset of the respective ones of the plurality of program components having an in-degree:out-degree ratio higher than an average in-degree:out-degree ratio of the respective ones of the plurality of program components.

6. The computer program product of claim 5, wherein, in determining the roles of the respective ones of the plurality of program components, the program instructions cause the one or more processors to calculate quartiles based at least in part on in-degree values of the respective ones of the plurality of program components in the subset.

7. The computer program product of claim 1, wherein the program instructions further cause the one or more processors to determine the roles of the respective ones of the plurality of program components for the plurality of programming languages.

8. The computer program product of claim 1, wherein, in providing the user interface, the program instructions cause the one or more processors to display at least one of the plurality of recommendations, the roles and the one or more metrics in the common format.

9. The computer program product of claim 1, wherein, in analyzing the modifications to the one or more of the plurality of recommendations, the program instructions cause the one or more processors to perform a what-if analysis.

10. The computer program product of claim 1, wherein the modifications to the one or more of the plurality of recommendations comprise a re-assignment of at least one of the respective ones of the plurality of program components from a first microservice of the plurality of microservices to a second microservice of the plurality of microservices.

11. The computer program product of claim 1, wherein the modifications to the one or more of the plurality of recommendations comprise at least one of an addition of a new program component to the plurality of program components, and a deletion of a program component from the plurality of program components.

12. A computer implemented method, comprising:
generating a plurality of recommendations comprising a plurality of program components as candidates for assignment to a plurality of microservices, wherein respective ones of the plurality of program components are in respective ones of a plurality of programming languages, and wherein, in generating the plurality of recommendations comprises transforming respective implementation structures of the respective ones of the plurality of program components from the respective ones of the plurality of programming languages to a common format;

determining roles of the respective ones of the plurality of program components;

providing a user interface configured to allow a user to modify one or more of the plurality of recommendations based at least in part on the roles;

analyzing modifications to the one or more of the plurality of recommendations;

computing one or more metrics based at least in part on the analysis, wherein the one or more metrics comprise an enterprise relevance score of the respective ones of the plurality of program components, and wherein the enterprise relevance score is computed based at least in part on call volume to the respective ones of the plurality of program components over a given time period;

determining a plurality of finalized recommendations for one or more of the respective ones of the plurality of program components for assignment to one or more of the plurality of microservices based at least in part on the one or more metrics; and generating one or more application programming interfaces for executing the one or more of the plurality of microservices;

wherein the computer implemented method is performed by at least one processing device comprising a processor coupled to a memory when executing program code.

13. The computer implemented method of claim 12, further comprising determining which of the respective ones of the plurality of program components require refactoring.

14. The computer implemented method of claim 13, wherein determining which of the respective ones of the plurality of program components require refactoring comprises:

determining a subset of the respective ones of the plurality of program components corresponding to greater than a threshold number of the plurality of microservices; and identifying the subset of the respective ones of the plurality of program components as requiring refactoring.

15. The computer implemented method of claim 12, wherein the roles comprise one or more of a utility role, a functionality role and a framework enablement role.

16. An apparatus comprising:

at least one processing device comprising a processor coupled to a memory, the at least one processing device, when executing program code, is configured to:

generate a plurality of recommendations comprising a plurality of program components as candidates for assignment to a plurality of microservices, wherein respective ones of the plurality of program components are in respective ones of a plurality of programming languages, and wherein, in generating the plurality of recommendations, the at least one processing device, when executing the program code, is configured to transform respective implementation structures of the respective ones of the plurality of program components from the respective ones of the plurality of programming languages to a common format;

determine roles of the respective ones of the plurality of program components;

provide a user interface configured to allow a user to modify one or more of the plurality of recommendations based at least in part on the roles;

analyze modifications to the one or more of the plurality of recommendations;

compute one or more metrics based at least in part on the analysis, wherein the one or more metrics comprise an enterprise relevance score of the respective ones of the plurality of program components, and wherein the enterprise relevance score is computed based at least in part on call volume to the respective ones of the plurality of program components over a given time period;

determine a plurality of finalized recommendations for one or more of the respective ones of the plurality of program components for assignment to one or more of the plurality of microservices based at least in part on the one or more metrics; and generate one or more application programming interfaces for executing the one or more of the plurality of microservices.

17. The apparatus of claim 16, wherein the at least one processing device, when executing the program code, is further configured to determine which of the respective ones of the plurality of program components require refactoring.

18. The apparatus of claim 17, wherein, in determining which of the respective ones of the plurality of program components require refactoring, the at least one processing device, when executing the program code, is further configured to:

determine a subset of the respective ones of the plurality of program components corresponding to greater than a threshold number of the plurality of microservices; and identify the subset of the respective ones of the plurality of program components as requiring refactoring.

19. The apparatus of claim 16, wherein the roles comprise one or more of a utility role, a functionality role and a framework enablement role.

20. The apparatus of claim 19, wherein, in determining the roles of the respective ones of the plurality of program components, the at least one processing device, when executing the program code, is further configured to:

determine an in-degree:out-degree ratio of the respective ones of the plurality of program components; and classify under the utility role a subset of the respective ones of the plurality of program components having an in-degree:out-degree ratio higher than an average in-degree:out-degree ratio of the respective ones of the plurality of program components.

* * * * *